(12) United States Patent
Ono et al.

(10) Patent No.: US 12,176,480 B2
(45) Date of Patent: Dec. 24, 2024

(54) LAMINATED BATTERY

(71) Applicant: TOYOTA JIDOSHA KABUSHIKI KAISHA, Toyota (JP)

(72) Inventors: Masato Ono, Nagoya (JP); Kazuhito Kato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 519 days.

(21) Appl. No.: 17/026,479

(22) Filed: Sep. 21, 2020

(65) Prior Publication Data

US 2021/0104775 A1   Apr. 8, 2021

(30) Foreign Application Priority Data

Oct. 2, 2019 (JP) ................. 2019-182297

(51) Int. Cl.
*H01M 10/0562* (2010.01)
(52) U.S. Cl.
CPC ............... *H01M 10/0562* (2013.01)
(58) Field of Classification Search
CPC .......... H01M 10/0525; H01M 10/0562
See application file for complete search history.

(56) References Cited

U.S. PATENT DOCUMENTS

| | | | |
|---|---|---|---|
| 2017/0263981 A1* | 9/2017 | Satou | H01M 4/663 |
| 2017/0373300 A1 | 12/2017 | Maeda et al. | |
| 2019/0097208 A1 | 3/2019 | Kawase et al. | |
| 2020/0313229 A1* | 10/2020 | Haga | H01M 10/0525 |

FOREIGN PATENT DOCUMENTS

| | | |
|---|---|---|
| CN | 107180995 A | 9/2017 |
| JP | 201238425 A | 2/2012 |
| JP | 2017-143004 A | 8/2017 |
| JP | 2017204377 A | 11/2017 |
| JP | 2019061952 A | 4/2019 |
| KR | 20160012591 A | 2/2016 |
| WO | 2016152565 A1 | 9/2016 |
| WO | 2019103008 A1 | 5/2019 |

\* cited by examiner

*Primary Examiner* — Osei K Amponsah
(74) *Attorney, Agent, or Firm* — Dickinson Wright, PLLC

(57) ABSTRACT

Provided is a laminated battery that exhibits high volume energy efficiency and allows preventing intrusion of an insulating material between layers during production of the battery. A laminated battery disclosed herein includes a first collector layer, a first electrode layer, a solid electrolyte layer, a second electrode layer and a second collector layer. The first electrode layer opposes the second electrode layer across the solid electrolyte layer. An insulating layer is provided at an edge of the second electrode layer, in at least one edge of the laminated battery. In a direction perpendicular to a stacking direction of the laminated battery, the edge of the second electrode layer is positioned closer to a center of the laminated battery than an edge of the first electrode layer, and an outer edge of the insulating layer lies at the same position as that of the edge of the first electrode layer, or is positioned closer to the center of the laminated battery than that of the edge of the first electrode layer. The thickness of the insulating layer is equal to or smaller than the thickness of the second electrode layer.

4 Claims, 3 Drawing Sheets

LAMINATED BATTERY

BACKGROUND OF THE INVENTION

1. Field of the Invention

The present disclosure relates to a laminated battery. The present application claims priority based on Japanese Patent Application No. 2019-182297, filed on Oct. 2, 2019, the entire contents of which are incorporated herein by reference.

2. Description of the Related Art

Ever higher performance is demanded from secondary batteries, such as lithium secondary batteries, as these become more widespread. All-solid-state batteries in which an electrolyte solution is replaced by a solid electrolyte have drawn attention as high-performance secondary batteries. Typically, all-solid-state batteries have a configuration in the form of stack of a positive electrode, a negative electrode, and a solid electrolyte interposed between the positive electrode and the negative electrode.

For instance, Japanese Patent Application Publication No. 2019-061952 discloses a battery in which a positive electrode active material layer provided on a positive electrode collector and a negative electrode active material layer provided on a negative electrode collector oppose each other across an electrolyte layer. Japanese Patent Application Publication No. 2019-061952 describes a feature in which an insulating sealing portion is provided at the periphery of power generation elements each having made up of the positive electrode active material layer, the negative electrode active material layer and the electrolyte layer. The sealing portion has a first portion within the range of a region at which the positive electrode collector and the negative electrode collector oppose each other, and a second portion outside the range of the above region. Japanese Patent Application Publication No. 2019-061952 discloses setting the formation range of the negative electrode active material layer to be larger than the formation range of the positive electrode active material layer.

Japanese Patent Application Publication No. 2019-061952 discloses a feature in which such a battery is produced by forming an active material layer and a solid electrolyte layer on a collector, to thereby produce a counter electrode plate, applying an insulating sealing material onto the periphery of the counter electrode plate, and laying then an electrode plate, while opposing the counter electrode plate, with pressure-bonding of the whole.

SUMMARY OF THE INVENTION

The above conventional configuration is problematic however in that an insulating member is disposed also outside the power generation elements, and as a result, the volume energy efficiency of the battery is low. Further problems include intrusion of the insulating sealing material between layers, at the time of layer build-up, which translates into lower battery performance and possible layer breakage caused by a restraint load.

Therefore, it is an object of the present disclosure to provide a laminated battery that exhibits high volume energy efficiency and allows preventing intrusion of an insulating material between layers during production of the battery.

A laminated battery disclosed herein includes a first collector layer, a first electrode layer, a solid electrolyte layer, a second electrode layer and a second collector layer. The first electrode layer opposes the second electrode layer across the solid electrolyte layer. An insulating layer is provided at an edge of the second electrode layer, in at least one edge of the laminated battery. In a direction perpendicular to a stacking direction of the laminated battery, the edge of the second electrode layer is positioned closer to a center of the laminated battery than an edge of the first electrode layer, and an outer edge of the insulating layer lies at the same position as that of the edge of the first electrode layer, or is positioned closer to the center of the laminated battery than that of the edge of the first electrode layer. A thickness of the insulating layer is equal to or smaller than a thickness of the second electrode layer.

Such a configuration allows providing is a laminated battery that exhibits high volume energy efficiency and allows preventing intrusion of an insulating material between layers during production of the battery.

In a desired implementation of the laminated battery disclosed herein, an edge of the second collector lies between the outer edge of the insulating layer and an inner edge of the insulating layer in the direction perpendicular to the stacking direction of the laminated battery.

Such a configuration allows preventing short-circuits, by virtue of the insulating layer, also in a case where the second collector has burrs.

In a desired implementation of the laminated battery disclosed herein, the thickness of the insulating layer is smaller than the thickness of the second electrode layer.

In such a configuration, a restraint load can be applied to the second electrode layer which is a power generation element, while application of a restraint load to the insulating layer, which is not a power generation element, can be prevented.

DESCRIPTION OF THE PREFERRED EMBODIMENTS

Figure 1:
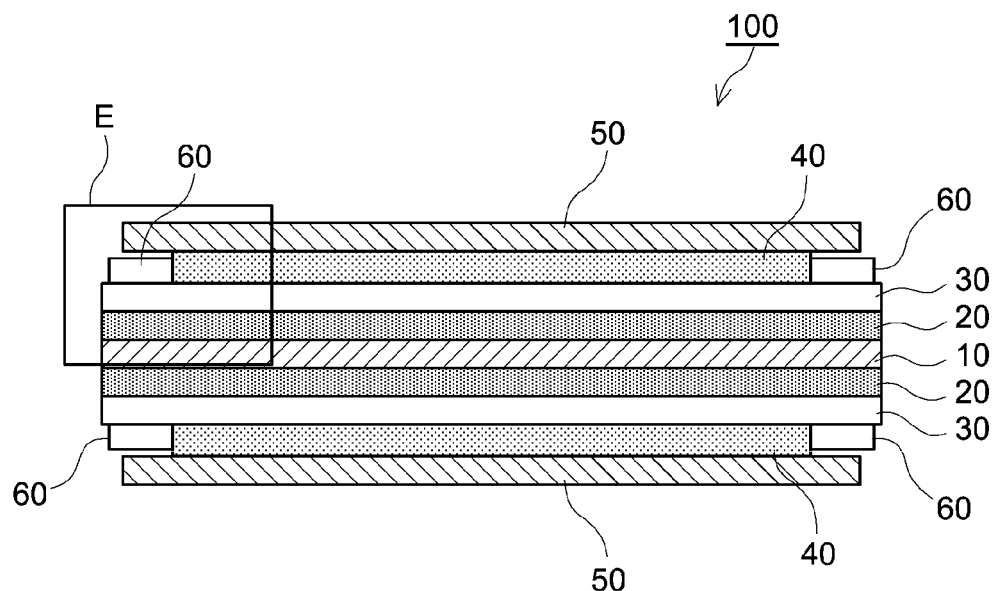
FIG. 1 is a schematic cross-sectional diagram illustrating an example of the layer build-up of a laminated battery according to an embodiment of the present disclosure.

Embodiments of the present disclosure will be explained below with reference to accompanying drawings. Any features other than the matter specifically set forth in the present specification and that may be necessary for carrying out the present disclosure (for instance, general configurations and production processes of laminated batteries which are not characterizing the present disclosure) can be grasped as design matters for a person skilled in the art based on conventional art in the technical field in question. The present disclosure can be carried out on the basis of the disclosure of the present specification and common technical knowledge in the relevant technical field. In the drawings below, members and portions that elicit identical effects may be explained while denoted with identical reference symbols. The dimensional relationships (length, width, thickness and so forth) in the drawings do not reflect actual dimensional relationships.

In the present specification, the term "battery" denotes power storage devices in general from which electrical energy can be drawn, and encompasses conceptually primary batteries and secondary batteries. In the present specification, the term "secondary battery" denotes a power storage device in general that can be charged and discharged repeatedly, and encompasses so-called storage batteries (i.e., chemical batteries) such as lithium ion secondary batteries, nickel-hydride batteries and nickel cadmium batteries, as well as capacitors (i.e., physical batteries) such as electrical double layer capacitors.

FIG. 1 illustrates schematically the configuration of a laminated battery according to the present embodiment.

The laminated battery 100 is provided with a negative electrode collector layer 10 as a first collector layer, a negative electrode active material layer 20 as a first electrode layer, a solid electrolyte layer 30, a positive electrode active material layer 40 as a second electrode layer, and a positive electrode collector layer 50 as a second collector layer. In this configuration, the formation range of the negative electrode active material layer 20 can be made larger than the formation range of the positive electrode active material layer 40. Precipitation of metallic lithium can be prevented as a result.

It should be noted that the laminated battery 100 can also adopt a configuration in which a first collector layer is a positive electrode collector layer, a first collector layer is a positive electrode collector layer, a second electrode layer is a negative electrode active material layer and a second collector layer is a negative electrode collector layer.

In the example illustrated in the figure, since a large-capacity laminated battery 100 can be produced efficiently, the negative electrode active material layer 20, the solid electrolyte layer 30, the positive electrode active material layer 40 and the positive electrode collector layer 50 are laid up on either face of the negative electrode collector layer 10. However, the laminated battery 100 may have a configuration in which the negative electrode active material layer 20, the solid electrolyte layer 30, the positive electrode active material layer 40 and the positive electrode collector layer 50 are laid only on one face of the negative electrode collector layer 10.

The negative electrode collector layer 10 is typically made up of a metallic material that does not readily form alloys with Li and which has good conductivity. Examples of the metallic material include Cu, Ni, Fe, Ti, Co, Zn and alloys (for example stainless steel) containing at least one of these metals; the metallic material is desirably Cu. The negative electrode collector layer 10 is desirably made up of a foil-like body, and is particularly suitably made up of a copper foil.

The negative electrode collector layer 10 may further have other layers in addition to the layer of the above metallic material.

The thickness of the negative electrode collector layer 10 is not particularly limited, but is desirably not less than 5 μm and not more than 50 μm, and more desirably not less than 8 μm and not more than 40 μm, in terms of the trade-off between the capacity density of the battery and collector strength.

The negative electrode active material layer 20 contains a negative electrode active material.

A known material used in known all-solid-state batteries can be used as the negative electrode active material.

Examples of negative electrode active materials include carbon-based negative electrode active materials such as graphite, hard carbon, soft carbon and carbon nanotubes; Si-based negative electrode active materials such as Si, silicon oxide, silicon carbide and silicon nitride; and Sn-based negative electrode active materials such as tin, tin oxide, tin nitride and tin-containing alloys.

The average particle size of the negative electrode active material is not particularly limited, but is, for instance, not less than 1 μm and not more than 20 μm, desirably not less than 2 μm and not more than 10 μm.

Unless otherwise stated, the term "average particle size" in the present specification denotes a particle size (also referred to as $D_{50}$ particle size; median size) corresponding to a cumulative 50%, from the fine particle side, in a volume-basis particle size distribution obtained from a particle size distribution measurement based on a laser diffraction-light scattering method.

The negative electrode active material layer 20 may further contain a solid electrolyte. Examples of the solid electrolyte include the same as those of the solid electrolyte used in the solid electrolyte layer 30 described below.

The negative electrode active material layer 20 may further contain, as needed, a conductive material (for example, carbon black such as acetylene black, vapor-grown carbon fibers (VGCFs) or carbon nanotubes), and a binder (for example, a fluorine-based binder such as polyvinylidene fluoride (PVDF) or polyethylene terephthalate (PTFE), or a rubber-based binder such as styrene butadiene rubber (SBR)).

The thickness of the negative electrode active material layer 20 is not particularly limited, but is for instance 0.1 μm to 1,000 μm, and desirably 10 μm to 500 μm.

The solid electrolyte layer 30 contains a solid electrolyte.

A known solid electrolyte used in all-solid-state batteries may be used herein as the solid electrolyte. Examples of the material that makes up the solid electrolyte include sulfide solid electrolyte materials, oxide solid electrolyte materials, nitride solid electrolyte materials and halide solid electrolyte materials. Examples of sulfide solid electrolyte materials include $Li_2S$—$P_2S_5$-based materials (for example a sulfide solid electrolyte produced through mixing of $Li_2S/P_2S_5$ (mass ratio)=50/50 or higher, in particular at a ratio of 70/30), $Li_2S$—$GeS_2$-based materials, $Li_2S$—$GeS_2$—$P_2S_5$-based materials, $Li_2S$—$SiS_2$-based materials, $Li_2S$—$B_2S_3$-based materials, $Li_3PO_4$—$P_2S_5$-based materials and the like. For instance, a material may be used (for example, LiI—$Li_2S$—$P_2S_5$, LiCl—LiI—$Li_2S$—$P_2S_5$, LiBr—LiI—$Li_2S$—$P_2S_5$, LiI—$Li_2S$—$SiS_2$ or LiI—$Li_2S$—$B_2S_3$) that results from adding a lithium halide to the above sulfide materials. Examples of oxide solid electrolyte materials include lithium-lanthanum-zirconium-containing composite oxides (LLZO), Al-doped LLZO, lithium-lanthanum-titanium-containing composite oxides (LLTO), Al-doped LLTO and lithium phosphate oxynitride (LIPON).

The average particle size of the solid electrolyte is not particularly limited, but is, for instance, not less than 0.1 μm and not more than 10 μm, desirably not less than 0.3 μm and not more than 5 μm.

The solid electrolyte layer 30 may further contain a binder (for example, a fluorine-based binder such as PVDF or PTFE, or a rubber-based binder such as butadiene rubber (BR) or SBR).

The thickness of the solid electrolyte layer 30 is not particularly limited, but is, for instance, not less than 0.1 μm and not more than 1,000 μm, desirably not less than 0.1 μm and not more than 300 μm.

The positive electrode active material layer 40 contains a positive electrode active material.

A known material used in all-solid-state batteries can be used as the positive electrode active material. Examples of the positive electrode active material include lithium-transition metal composite oxides such as lithium-nickel composite oxides, lithium-cobalt composite oxides, lithium-manganese composite oxides, lithium-nickel-cobalt composite oxides, lithium-nickel-manganese composite oxides and lithium-nickel-cobalt-manganese composite oxides; as well as lithium composite compounds having olivine structure such as $LiFePO_4$.

The average particle size of the positive electrode active material is not particularly limited, but is, for instance, not less than 0.5 μm and not more than 20 μm, desirably not less than 1 μm and not more than 10 μm.

The positive electrode active material layer 40 may further contain a solid electrolyte. Examples of the solid electrolyte include the same as those of the above solid electrolyte used in the solid electrolyte layer 30.

The positive electrode active material layer 40 may further contain, as needed, a conductive material (for example, carbon black such as acetylene black, graphite, vapor-grown carbon fibers (VGCFs) and carbon nanotubes) and/or a binder (for example a fluorine-based binder such as PVDF or PTFE, or a rubber-based binder such as SBR).

The thickness of the positive electrode active material layer 40 is not particularly limited, but is, for instance, not less than 0.1 μm and not more than 1000 μm, desirably not less than 10 μm and not more than 500 μm.

The positive electrode collector layer 50 is typically made up of a metallic material having good conductivity. Examples of the above metallic material include Al, Ni, Cr, Pt, Fe, Ti, Zn and alloys (for example, stainless steel or nitrogen-containing alloys) containing at least one of these metals; the metallic material is desirably Al. The positive electrode collector layer 50 is desirably made up of a foil-like body, and is particularly suitably made up of an aluminum foil.

The positive electrode collector layer 50 may further have other layers in addition to the layer of the above metallic material. Examples of other layers include carbon coat layers (for example, a surface layer containing 15 mass % of carbon and 85 mass % of PVDF).

The thickness of the positive electrode collector layer 50 is not particularly limited, but is desirably not less than 5 μm and not more than 50 μm, and more desirably not less than 8 μm and not more than 30 μm, in terms of the trade-off between the capacity density of the battery and collector strength.

In the laminated battery 100, the negative electrode collector layer 10, the negative electrode active material layer 20, the solid electrolyte layer 30, the positive electrode active material layer 40 and the positive electrode collector layer 50 are sequentially laid up.

The solid electrolyte layer 30 is positioned between the negative electrode active material layer 20 and the positive electrode active material layer 40.

The positive electrode active material layer 40 opposes the negative electrode active material layer 20 across the solid electrolyte layer 30.

One of the main surfaces of the negative electrode active material layer 20 opposes the negative electrode collector layer 10, and the other main surface of the negative electrode active material layer 20 opposes the solid electrolyte layer 30.

One of the main surfaces of the positive electrode active material layer 40 opposes the positive electrode collector layer 50, and the other main surface of the positive electrode active material layer 40 opposes the solid electrolyte layer 30.

An insulating layer 60 is provided at edges of the positive electrode active material layer 40.

The insulating layer 60 is made up of an insulating material, specifically for instance, a resin material or an inorganic material, Both a thermoplastic resin (for example, an acrylic resin or polypropylene) and a thermosetting resin, but desirably a thermoplastic resin, can be used herein as the resin material. Thermoplastic resins are advantageous in terms of making it possible to easily form the insulating layer 60 by being applied in a molten state, and being then cooled.

Herein, a UV curable resin (for example, a UV curable acrylic resin) containing a polymerizable monomer and a photopolymerization initiator can be used as the resin material. Such UV curable resins are advantageous in that they allow easily forming the insulating layer 60 through application and UV irradiation.

Examples of inorganic materials include inorganic oxides such as alumina ($Al_2O_3$), magnesia (MgO), silica ($SiO_2$) and titania ($TiO_2$); nitrides such as aluminum nitride and silicon nitride; metal hydroxides such as calcium hydroxide, magnesium hydroxide and aluminum hydroxide; clay minerals such as mica, talc, boehmite, zeolites, apatite and kaolin; and glass fibers. The foregoing can be used singly or in combinations of two or more types. Alumina and boehmite are desired among the foregoing. In a case where the insulating layer 60 is made up of an inorganic material (in particular, an inorganic filler), the insulating layer 60 may contain a binder (for example, a fluorine-based binder such as PVDF or PTFE, or a rubber-based binder such as SBR). The case where the insulating layer 60 is made up of an inorganic material is advantageous in terms of the high mechanical strength of the insulating layer 60.

The insulating layer 60 may have a multilayer structure. For instance, the insulating layer 60 may have a base material layer and a pressure-sensitive adhesive layer. Accordingly, the insulating layer 60 may be a pressure-sensitive adhesive tape or pressure-sensitive adhesive sheet having a base material layer and a pressure-sensitive adhesive layer. The case where the insulating layer 60 is made up of a pressure-sensitive adhesive tape or a pressure-sensitive adhesive sheet is advantageous in that the insulating layer 60 can be easily formed uniformly to a desired thickness.

Figure 2:
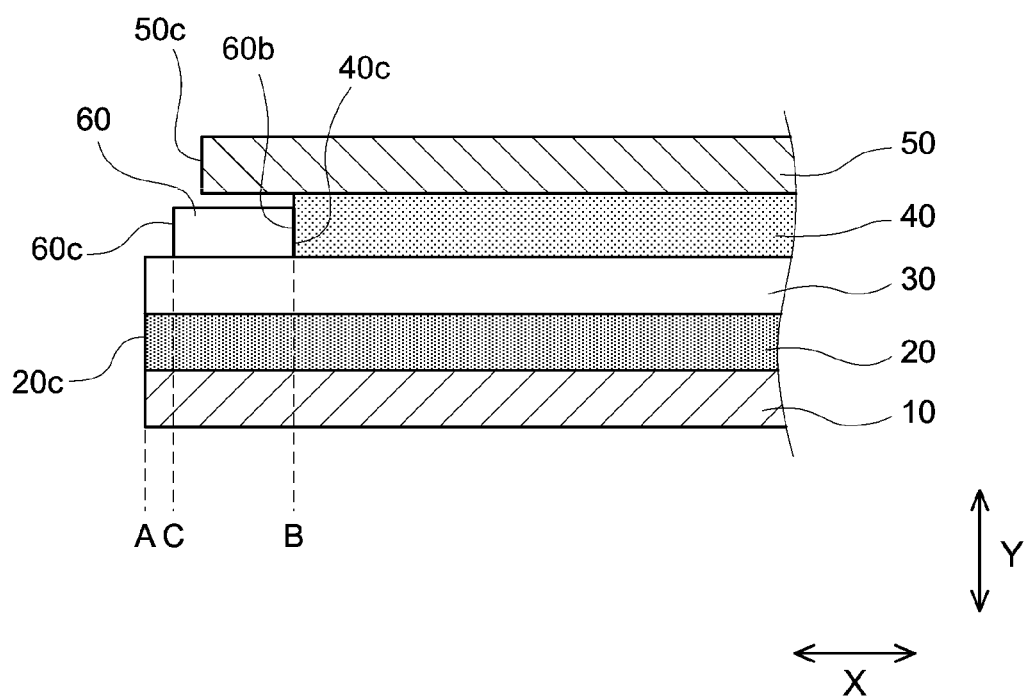
FIG. 2 is an enlarged-view diagram of frame E of FIG. 1.

FIG. 2 illustrates an enlarged-view diagram of an edge of a laminated battery 100. In FIG. 2, direction Y is the stacking direction of the laminated battery 100, and direction X is a direction perpendicular to direction Y and is also a main surface direction of each layer of the laminated battery 100.

Herein, A denotes the position of an edge 20c of the negative electrode active material layer 20, in direction X. Further, position B of an edge 40c of the positive electrode active material layer 40 is located closer to the center of the laminated battery 100 than position A. In the illustrated example, the right side of FIG. 2 is the side closer to the center of the laminated battery 100.

In the present embodiment, position C of an outer edge 60c of the insulating layer 60 is located at the same position as position A, or closer to the center of the laminated battery 100 than position A, in direction X. In the example illustrated in the figure, position C of the outer edge 60c of the insulating layer 60 lies closer to the center of the laminated battery 100.

The thickness of the insulating layer 60 (i.e., dimension in the stacking direction of the laminated battery) is equal to or smaller than the thickness of the positive electrode active material layer 40.

The insulating layer 60 thus configured is not disposed outside the stack portion of power generation elements (i.e., negative electrode active material layer 20, solid electrolyte layer 30 and positive electrode active material layer 40), and accordingly the volume energy efficiency of the laminated battery 100 is high.

The insulating layer 60 configured having such a thickness and at such a position allows preventing the constituent materials of the insulating layer 60 from intruding between layers, when these are built up. As a result, drops in battery performance, and layer breakage derived from a restraint load can be suppressed.

In the illustrated example, the thickness of the insulating layer 60 is smaller than the thickness of the positive electrode active material layer 40. The laminated battery 100 is used under application of a restraint load. Desirably, therefore, a restraint load is applied to the positive electrode active material layer 40 which is a power generation element, while no restraint load is applied to the insulating layer 60 which is not a power generation element. Application of a restraint load to the insulating layer 60 can be prevented in a case where the thickness of the insulating layer 60 is smaller than the thickness of the positive electrode active material layer 40, as in the illustrated example.

Therefore, the thickness of the insulating layer 60 is desirably smaller than the thickness of the positive electrode active material layer 40. The thickness of the insulating layer 60 is more desirably 98% or less, and yet more desirably 96% or less, of the thickness of the positive electrode active material layer 40. On the other hand, the thickness of the insulating layer 60 is desirably 20% or more, more desirably 30% or more, and yet more desirably 40% or more, of the thickness of the positive electrode active material layer 40, since in that case insulating properties derived from the insulating layer 60 can be readily ensured at a high level.

In the illustrated example, the insulating layer 60 is in contact with the positive electrode active material layer 40. However, the insulating layer 60 is not limited to the above configuration, so long as insulating properties by the insulating layer 60 can be ensured.

A gap may be provided between the insulating layer 60 and the positive electrode active material layer 40. In the illustrated example, the insulating layer 60 is provided on the solid electrolyte layer 30, but is not limited to being thus disposed. For instance, the insulating layer 60 may be provided on the positive electrode collector layer 50.

The position of the edge 50c of the positive electrode collector layer 50 is not particularly limited, and for instance, the edge 50c may be disposed, in the form of a collector tab or the like, further outward in the laminated battery 100 than position A of the edge 20c of the negative electrode active material layer 20, in direction X. Contact with the negative electrode is readily prevented in a case where the position of the edge 50c of the positive electrode collector layer 50 in direction X lies closer to the center of the laminated battery 100 than position A of the edge 20c of the negative electrode active material layer 20.

In a desired embodiment, the edge 50c of the positive electrode collector layer 50 is positioned between the outer edge 60c and an inner edge 60b (including also the outer edge 60c and the inner edge 60b) of the insulating layer 60 in direction X, as in the illustrated example. In a more desired embodiment, the edge 50c of the positive electrode collector layer 50 is positioned in a central region of the insulating layer 60 in direction X, i.e. is positioned between the midpoint of a center position and the outer edge 60c, and the midpoint of the center position and the inner edge 60b. The outer edge 60c of the insulating layer 60 is an edge of the insulating layer 60, on the outward side of the laminated battery 100, in direction X, while the inner edge 60b is an edge, of the insulating layer 60, closer to the center of the laminated battery 100, in direction X.

Burrs may form at cut surfaces of edges of collectors when are cut to a predetermined size. In a case where burrs is present at an edges of a collector and come into contact with an active material layer or solid electrolyte layer, that layer may break and a short-circuit may occur when a restraint load is applied to the laminated battery. In a case however where the edge 50c of the positive electrode collector layer 50 lies between the outer edge 60c and the inner edge 60b of the insulating layer 60, in direction X, short-circuits can be prevented by the insulating layer 60, even when the positive electrode collector layer 50 has burrs.

Figure 3:
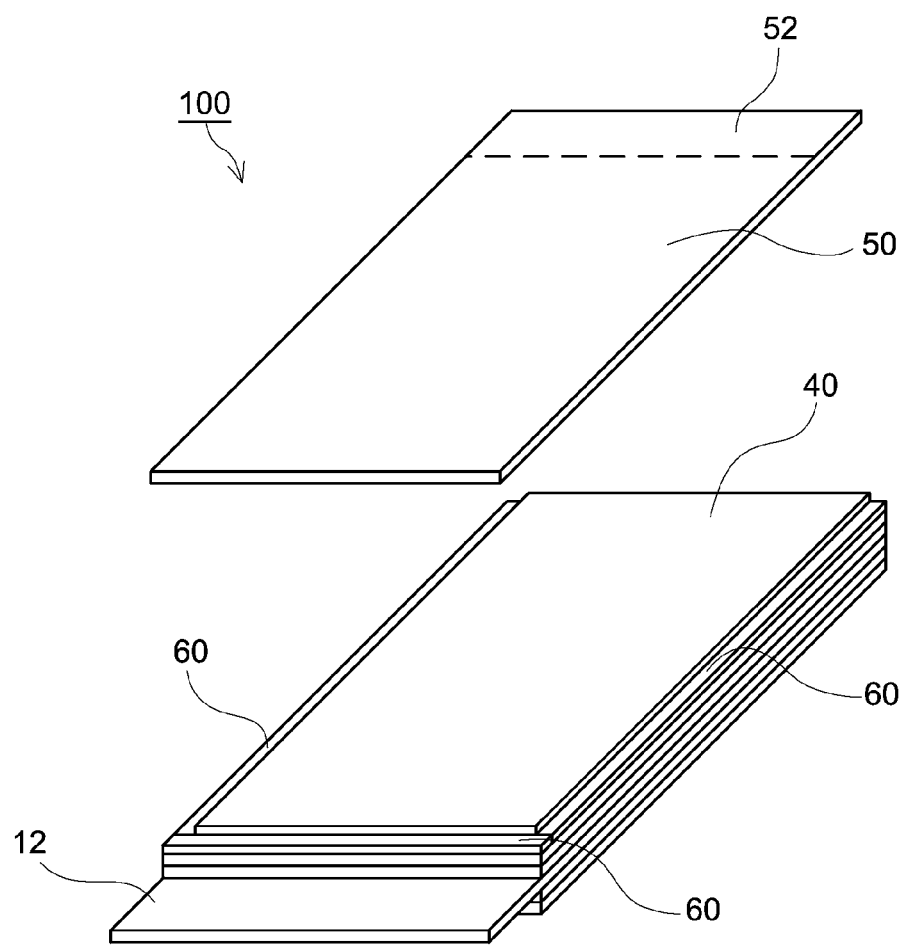
FIG. 3 is a partial exploded perspective-view diagram of a laminated battery according to an embodiment of the present disclosure.

FIG. 3 illustrates a partial exploded perspective-view diagram of the laminated battery 100. In the depiction of FIG. 3, the positive electrode collector layer 50 at the top has been lifted so that the insulating layer 60 can be viewed.

The laminated battery 100 has a cuboid stack portion. The positive electrode collector layer 50 extends beyond one of the edges of the stack portion, to form a positive electrode collector tab 52. The negative electrode collector layer 10 extends from the opposite edge, to form a negative electrode collector tab 12. The insulating layer 60 is provided at edges, of the positive electrode active material layer 40, at both ends of the stack in the width direction (i.e., a direction perpendicular to the longitudinal direction of the laminated battery 100). Also, the insulating layer 60 is provided at an edge of the positive electrode active material layer 40, at one end in the longitudinal direction.

The insulating layer 60 at the edges in the width direction is suitably made up of an inorganic material. In this case, a paste containing an inorganic material is applied, along the flow direction of the production line, and the paste is dried, so that the insulating layer 60 can be formed as a result, with excellent production efficiency. Alternatively, the insulating layer 60 at the edges in the width direction is suitably made up of a UV curable resin. In this case as well, a UV curable resin is applied along the flow direction of the production line, and the resin is irradiated with ultraviolet rays, so that the insulating layer 60 can be formed as a result, with excellent production efficiency.

The insulating layer 60 at the edge in the longitudinal direction is suitably made up of a pressure-sensitive adhesive tape.

The laminated battery 100 has the insulating layer 60 at least at one edge, with the insulating layer 60 having the above-described configuration.

In the illustrated example, the laminated battery 100 has the insulating layer 60 at three edges, with each insulating layer 60 having the configuration described above. However, the laminated battery 100 is not limited thereto, and may have the insulating layer 60 at one, two or four edges, with each insulating layer 60 having the configuration described above.

Such a laminated battery 100 can be produced, for instance, as follows.

A coating paste containing a negative electrode active material, a binder and so forth is applied on a negative electrode collector as the negative electrode collector layer 10, and then dried, to thereby form the negative electrode active material layer 20.

A coating paste containing a solid electrolyte is next applied on the formed negative electrode active material layer 20, and then dried, to thereby form the solid electrolyte layer 30.

Meanwhile, a coating paste containing a positive electrode active material, a binder and so forth is applied on a release base material, and then dried, to thereby form the positive electrode active material layer 40.

The positive electrode active material layer 40 is laid up on the solid electrolyte layer 30, and pressure (for instance, about 100 MPa) is applied, to transfer the positive electrode active material layer 40 from the release base material to the solid electrolyte layer 30. After transfer, the release base material is stripped off the obtained stack. Pressure (for instance, about 600 MPa) may be applied to the stack, as a densification treatment, so that the materials that make up the stack come more into contact with each other. Application of pressure can be performed, for instance, by mechanical pressing or gas pressurization.

The insulating layer 60 is provided at edges of the positive electrode active material layer 40. The insulating layer 60 can be formed as appropriate in accordance with the type of the insulating material. As an example, the insulating layer 60 can be provided by applying a UV curable resin at edge positions of the positive electrode active material layer 40 on the solid electrolyte layer 30, and then irradiating the UV curable resin with ultraviolet rays. In another example, the insulating layer 60 can be provided by applying a molten resin material at edge positions of the positive electrode active material layer 40 on the solid electrolyte layer 30, followed by cooling. In another example, the insulating layer 60 can be provided by applying a paste containing an inorganic filler at edge positions of the positive electrode active material layer 40 on the solid electrolyte layer 30, followed by drying. In yet another example, the insulating layer 60 can be provided by affixing a pressure-sensitive adhesive tape at edge positions of the positive electrode active material layer 40 on the solid electrolyte layer 30.

The positive electrode collector as the positive electrode collector layer 50 is bonded to the positive electrode active material layer 40 by pressing while under heating (for instance, at a temperature of about 140° C. and under a pressure of about 1 MPa), using a hot-melt adhesive or the like. The type of the hot-melt adhesive may be determined as appropriate in accordance with the degradation temperature of the constituent materials of the laminated battery 100, and for instance, an ethylene-vinyl acetate copolymer (EVA)-based hot-melt adhesive or a polyolefin-based hot-melt adhesive such as of low-density polyethylene (LDPE)-based hot-melt adhesive, can be used herein.

Figure 4:
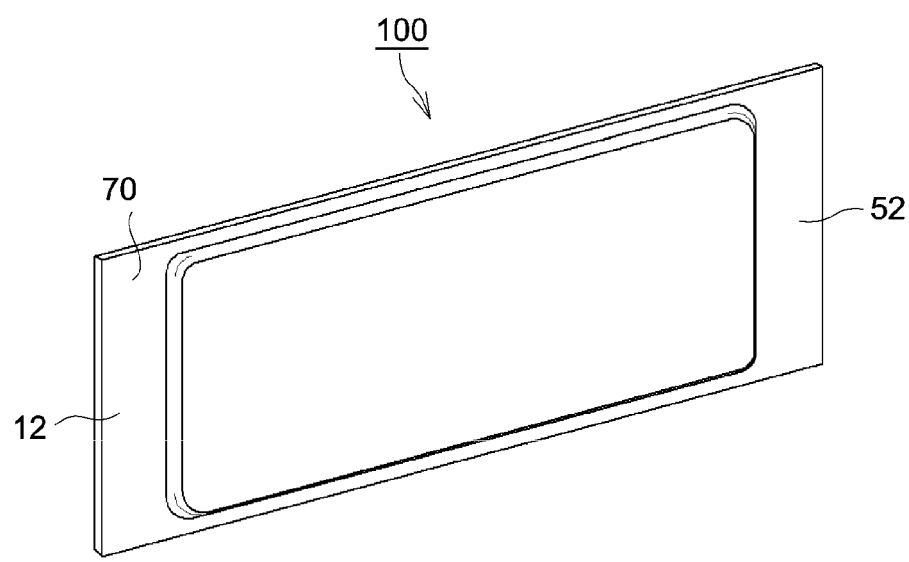
FIG. 4 is a perspective-view diagram of a laminated battery according to an embodiment of the present disclosure.

Ordinarily, the laminated battery 100 further has a case 70 such as a laminate case, as illustrated in FIG. 4. The negative electrode collector tab 12 and the positive electrode collector tab 52 protrude in opposite directions from the case 70, but a configuration may be adopted in which the negative electrode collector tab 12 and the positive electrode collector tab 52 protrude in the same direction from the laminate case 70.

The laminated battery 100 is used while under application of a restraint load to the battery, so that the various layers are more in contact with each other. For instance, a pressure of not less than 1 MPa and not more than 45 MPa is applied to the stack portion of the power generation elements, during use of the laminated battery 100, whereas a pressure of not less than 0 MPa and not more than 1 MPa is applied to the stack portion of the power generation elements at times where the laminated battery 100 is not in use.

The laminated battery 100 can be used in various applications. Specific examples of such applications include portable power sources for personal computers, portable electronic devices, mobile terminals and the like; power sources for vehicle drive in electric vehicles (EV), hybrid vehicles (HV), plug-in hybrid vehicles (PHV) and the like; as well as storage batteries such as compact power storage devices. Among the foregoing, the laminated battery 100 is desirably a power source for vehicle drive. The laminated battery 100 can be used in the form of a battery pack resulting from connecting a plurality of laminated batteries 100 in series and/or in parallel.

Concrete examples of the present disclosure have been explained in detail above, but the examples are merely illustrative in nature, and are not meant to limit the claims in any way. The art set forth in the claims encompasses various modifications and alterations of the concrete examples illustrated above.

What is claimed is:

1. A laminated battery, comprising:
   a first collector layer;
   a first electrode layer;
   a solid electrolyte layer;
   a second electrode layer; and
   a second collector layer,
   wherein the first electrode layer opposes the second electrode layer across the solid electrolyte layer,
   an insulating layer is provided at an edge of the second electrode layer, in at least one edge of the laminated battery such that in a direction perpendicular to a stacking direction of the laminated battery, the edge of the second electrode layer is positioned closer to a center of the laminated battery than an edge of the first electrode layer, and an outer edge of the insulating layer is positioned closer to the center of the laminated battery than that of the edge of the first electrode layer,
   a thickness of the insulating layer is smaller than a thickness of the second electrode layer,
   a gap is provided between the insulating layer and the second collector layer, and
   the insulating layer is provided on the solid electrolyte layer.

2. The laminated battery according to claim 1, wherein an edge of the second collector lies between the outer edge of the insulating layer and an inner edge of the insulating layer in the direction perpendicular to the stacking direction of the laminated battery.

3. A laminated battery, comprising:
   a first collector layer;
   a first electrode layer;
   a solid electrolyte layer;
   a second electrode layer; and
   a second collector layer,
   wherein the first electrode layer opposes the second electrode layer across the solid electrolyte layer,
   an insulating layer is provided at an edge of the second electrode layer, in at least one edge of the laminated battery such that in a direction perpendicular to a stacking direction of the laminated battery, the edge of the second electrode layer is positioned closer to a center of the laminated battery than an edge of the first electrode layer, and an outer edge of the insulating layer is positioned closer to the center of the laminated battery than that of the edge of the first electrode layer, a thickness of the insulating layer is smaller than a thickness of the second electrode layer, and a gap is provided between the insulating layer and the second collector layer.

4. The laminated battery according to claim 3, wherein an edge of the second collector lies between the outer edge of the insulating layer and an inner edge of the insulating layer in the direction perpendicular to the stacking direction of the laminated battery.

* * * * *